United States Patent
Sharma et al.

(10) Patent No.: US 12,306,739 B2
(45) Date of Patent: May 20, 2025

(54) DEVELOPMENT PIPELINE INTEGRATED ONGOING LEARNING FOR ASSISTED CODE REMEDIATION

(71) Applicant: Veracode, Inc., Burlington, MA (US)

(72) Inventors: Asankhaya Sharma, Singapore (SG); Hao Xiao, Singapore (SG); Hendy Heng Lee Chua, Singapore (SG); Darius Tsien Wei Foo, Singapore (SG)

(73) Assignee: Veracode, Inc., Burlington, MA (US)

( * ) Notice: Subject to any disclaimer, the term of this patent is extended or adjusted under 35 U.S.C. 154(b) by 40 days.

(21) Appl. No.: 18/250,794

(22) PCT Filed: Oct. 29, 2020

(86) PCT No.: PCT/US2020/058067
§ 371 (c)(1),
(2) Date: Apr. 27, 2023

(87) PCT Pub. No.: WO2022/093250
PCT Pub. Date: May 5, 2022

(65) Prior Publication Data
US 2023/0409464 A1 Dec. 21, 2023

(51) Int. Cl.
*G06F 11/36* (2006.01)
*G06F 8/30* (2018.01)
(Continued)

(52) U.S. Cl.
CPC ............ *G06F 11/3624* (2013.01); *G06F 8/30* (2013.01); *G06F 8/36* (2013.01); *G06F 21/577* (2013.01);
(Continued)

(58) Field of Classification Search
CPC .. G06F 20/00; G06F 11/3624; G06F 11/3664; G06F 8/30; G06F 8/36;
(Continued)

(56) References Cited

U.S. PATENT DOCUMENTS 9,792,443 B1 10/2017 Sheridan et al.
10,565,093 B1 * 2/2020 Herrin ....................... G06F 8/77
(Continued)

OTHER PUBLICATIONS

Jeffrey, Dennis, et al., BugFix: A learning-based tool to assist developers in fixing bugs, IEEE 17th International Conference on Program Comprehension, 2009, 10 pages, [retrieved on Oct. 30, 2024], Retrieved from the Internet: <URL:http://ieeexplore.ieee.org/>.*

Li, Yi, et al., DLFix: Context-based Code Transformation Learning for Automated Program Repair, ICSE '20: Proceedings of the ACM/IEEE 42nd International Conference on Software Engineering, 2020, 13 pages, [retrieved on Oct. 30, 24], Retrieved from the Internet: < URL:http://dl.acm.org/>.*

(Continued)

*Primary Examiner* — Geoffrey R St Leger
(74) *Attorney, Agent, or Firm* — Gilliam IP PLLC

(57) ABSTRACT

With invocations of a software development pipeline, organization specific remediations/fixes for a software project can be learned from scanning results of code submissions (e.g., commits or merges) across an organization for a software project(s). Fixes of detected program code flaws can be detected and/or specified across scans and associated with flaw identifiers and used for training machine learning models to identify candidate fixes for detected flaws. This ongoing learning during development propagates fixes created or chosen by experts (e.g., software engineers working on the software project) relevant to the software project. The experts can choose from suggestions mined from the learned fixes of the organization and suggestions generated from a pipeline created with the trained machine learning models. The selections are then used for further training of the machine learning models that form the pipeline.

20 Claims, 11 Drawing Sheets

(51) Int. Cl.
  *G06F 8/36* (2018.01)
  *G06F 11/362* (2025.01)
  *G06F 21/57* (2013.01)
  *G06N 3/0464* (2023.01)
  *G06N 3/08* (2023.01)
  *G06N 20/00* (2019.01)
  *G06N 3/09* (2023.01)

(52) U.S. Cl.
  CPC .............. *G06N 3/0464* (2023.01); *G06N 3/08* (2013.01); *G06N 20/00* (2019.01); *G06N 3/09* (2023.01)

(58) Field of Classification Search
  CPC ........ G06F 8/71; G06F 21/552; G06F 21/577; G06N 3/0464; G06N 3/08; G06N 3/09
  See application file for complete search history.

(56) References Cited

U.S. PATENT DOCUMENTS

2017/0212829 A1* 7/2017 Bales ................... G06F 11/3604
2019/0108001 A1* 4/2019 Hauser ................ G06F 11/3668
2019/0287029 A1   9/2019 Sobran et al.
2021/0357307 A1* 11/2021 Deng ..................... G06N 3/088

OTHER PUBLICATIONS

PCT Application Serial No. PCT/US2020/058067, International Search Report, mailed Feb. 1, 2021, 2 pages.
PCT Application Serial No. PCT/US2020/058067, Written Opinion, mailed Feb. 1, 2021, 6 pages

* cited by examiner

DEVELOPMENT PIPELINE INTEGRATED ONGOING LEARNING FOR ASSISTED CODE REMEDIATION

TECHNICAL FIELD

The disclosure generally relates to the field of software development and to testing and debugging.

BACKGROUND ART

The set of software development practices at least partly fostered by the growth of software as a service (SaaS) is referred to as DevOps. DevOps is a portmanteau of development and operations—software development and information technology (IT) operations. The intent is to reduce the time between committing a code change to a system or application and deploying the system/application without compromising quality. The set of practices can include continuous integration (CI) and continuous development (CD) to rapidly build, test, deploy/deliver software with quality and control.

The importance of securing software has led to incorporating security into DevOps and yielding a set of processes referred to as DevSecOps, SecDevOps, or Secure DevOps. This secure paradigm promotes a shift left in security from near the end of a software development lifecycle towards the beginning. This shift left attempts to include the expertise and tools of security analysis/scanning, thus ensuring quality, without hampering the speed sought by DevOps.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that illustrate embodiments of the disclosure. However, it is understood that this disclosure may be practiced without these specific details. For instance, this disclosure refers to abstract syntax trees as illustrative examples of a data structure that captures structural context of program code. Aspects of this disclosure can use other intermediate representations to express or describe the structural context of program code, such as a control flow graph. In other instances, well-known instruction instances, protocols, structures and techniques have not been shown in detail in order not to obfuscate the description.

Overview

Assisted software remediation disclosed herein incorporates security into a software development pipeline and preserves the rapidity of the software development pipeline. With invocations of the pipeline, organization specific remediations/fixes for a software project can be learned from scanning results of code submissions (e.g., commits or merges) across an organization for a project(s). Flaw fixes can be detected and/or specified across scans and associated with flaw identifiers. This ongoing learning during development efficiently propagates fixes created or chosen by experts (e.g., software engineers working on the software project) relevant to the software project. The experts can choose from suggestions mined from the learned fixes of the organization and suggestions generated from a trained model pipeline created with supervised machine learning with flaw and fix training data from outside of the organization.

Example Illustrations

Figure 1:
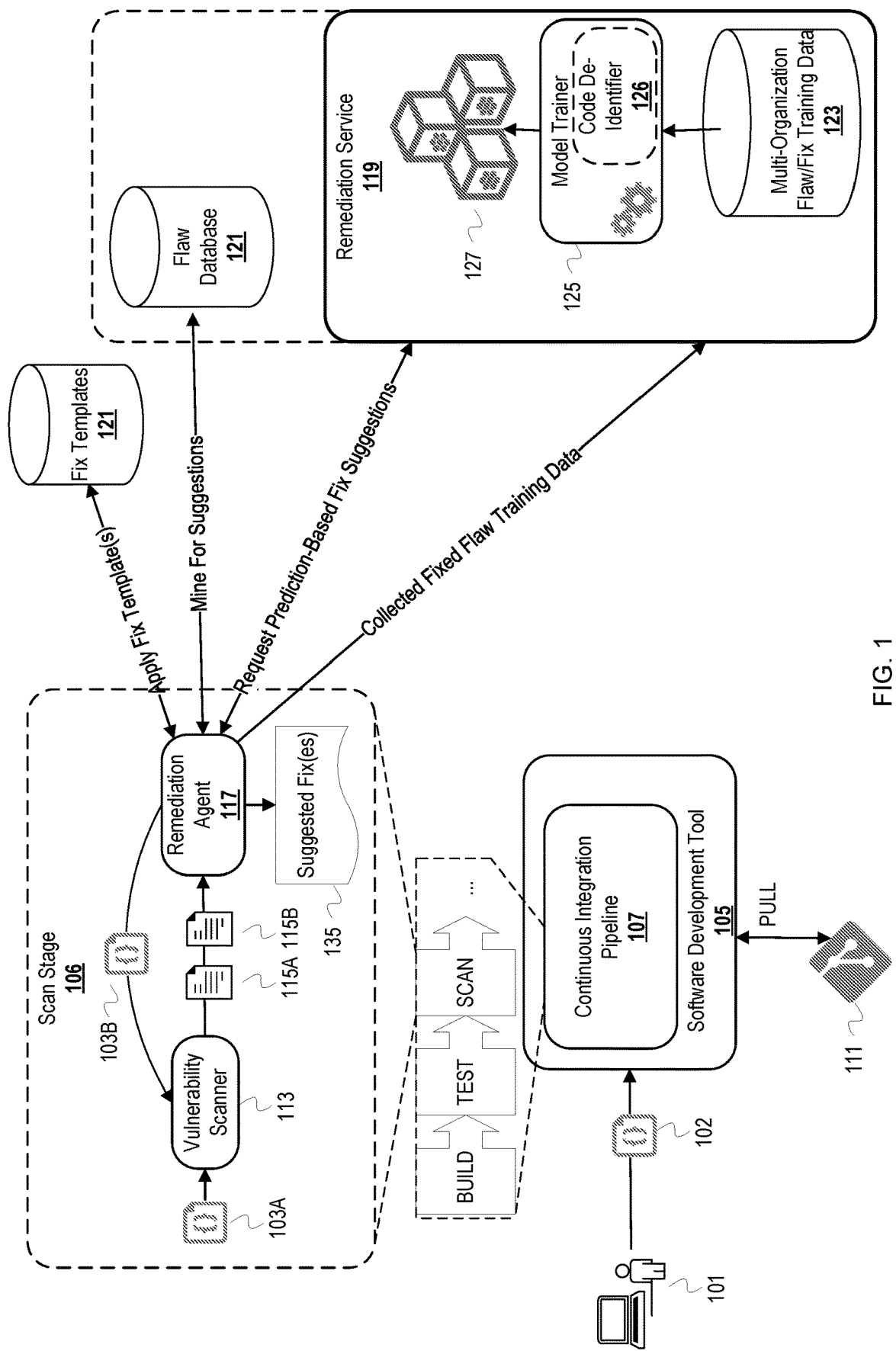
FIG. 1 is a system diagram illustrating a pipeline integrated remediation agent that presents suggested fixes for flaws and facilitates ongoing learning of fixes for a software project.

FIG. 1 is a system diagram illustrating a pipeline integrated remediation agent that presents suggested fixes for flaws and facilitates ongoing learning of fixes for a software project. While embodiments can be used with various types of software development pipelines, FIG. 1 uses a continuous integration (CI) pipeline 107 as an example pipeline for the illustration. The CI pipeline 107 is implemented with a software development tool 105. A remediation agent 117 can be program code integrated into the software development tool 105 or invoked from the software development tool 105, for example via an application programming interface (API). The remediation agent 117 communicates with a remediation service 119 as part of obtaining fix suggestions and facilitating ongoing learning of fixes.

During a software project, developers/engineers will submit code changes through a software development tool that implements a defined development pipeline. FIG. 1 illustrates a single instance of a developer 101 submitting a code change 102 for a software project with the software development tool 105 that implements the CI pipeline 107. Submission of a code change can be a commit, merge, push, etc., depending on the software development tool being used. The code change 102 may be program code being added to the software project or a revision/edit of program code existing in the software project. The submission of the code change 102 triggers running of the CI pipeline 107 as defined in a pipeline configuration file. The CI pipeline 107 has been defined to at least include a scan stage occurring after the build and test stages. The scan stage invokes a vulnerability scanner 113.

The remediation agent 117 operates with scan results from the vulnerability scanner 113 to obtain fix suggestions for detected flaws and possibly apply automated code remediations. An initial input to the vulnerability scanner 113 is identified in FIG. 1 as program code 103A. The program code 103A may be the code change 102, an intermediate representation of the code change 102, or an intermediate representation of at least a part of the software project with the code change 102 incorporated. FIG. 1 depicts the vulnerability scanner 113 passing two scan results 115A, 115B because scans can occur at different times. With the first scan results 115A, the remediation agent 117 attempts to apply automatic remediation using templates ("fix templates"). The remediation agent 117 accesses a repository of fix templates 121 to determine whether flaws in the scan results 115A can be resolved based on any of the fix templates. Assuming at least one of the vulnerabilities can be resolved with a fix template, the remediation agent 111 applies the fix template and submits code with the fix with a pull request to a code repository 111. The remediation agent 111 then runs the CI pipeline 107 again on the resulting code 103B which leads to the vulnerability scanner 113 generating the second scan results 115B.

After applying available template based remediation, the remediation agent 117 obtains potential fixes for the remaining flaws to present as suggested fixes for the remaining flaws. The remediation agent 117 obtains the suggested fixes for remaining flaws by interacting with the remediation service 119 and a flaw database 121, which can be implemented as part of the remediation service 119 as represented by the dashed line encompassing the flaw database 121. The remediation agent 117 searches or mines the flaw database 121 for potential fixes for the remaining flaws. These potential fixes would be fixes previously determined or indicated within a first scope of flaws/fixes corresponding to the software project (e.g., scoped to the software project, a specified team(s), or organization managing or owning the software project). The remediation agent 117 also communicates or inputs the remaining flaws to the remediation service 119 to obtain potential fixes output by one or more of trained models 127. The remediation service 119 includes the trained models 127, a repository 123 of multi-organization flaw/fix training data, and a model trainer 125. The trained models 127 have been trained with flaw/fix training data from the repository 123. This multi-organization training data has a greater scope of flaws/fixes than the first scope. The multi-organization flaw/fix training data is based on data from various sources, such as open source software repositories, peer organizations, etc. To allow for training with the multi-organization training data of larger scope without exposing proprietary information, the model trainer 125 can utilize a code de-identifier 126.

After obtaining the potential fixes to the remaining flaws, the remediation agent 117 presents the potential fixes as suggested fixes 135. Presentation of the suggested fixes 135 can be implemented differently. The remediation agent 117 can update the scan results 115B to include the suggested fixes 135. The remediation agent 117 can pass the suggested fixes 135 in association with the corresponding remaining flaws to the software development tool 105 instance being used by the developer 101. The remediation agent 117 may have its own user interface and present the suggested fixes 135 itself. In some implementations, the remediation agent 117 can store the information or generate a notification of the suggested fixes 135.

Figure 2:
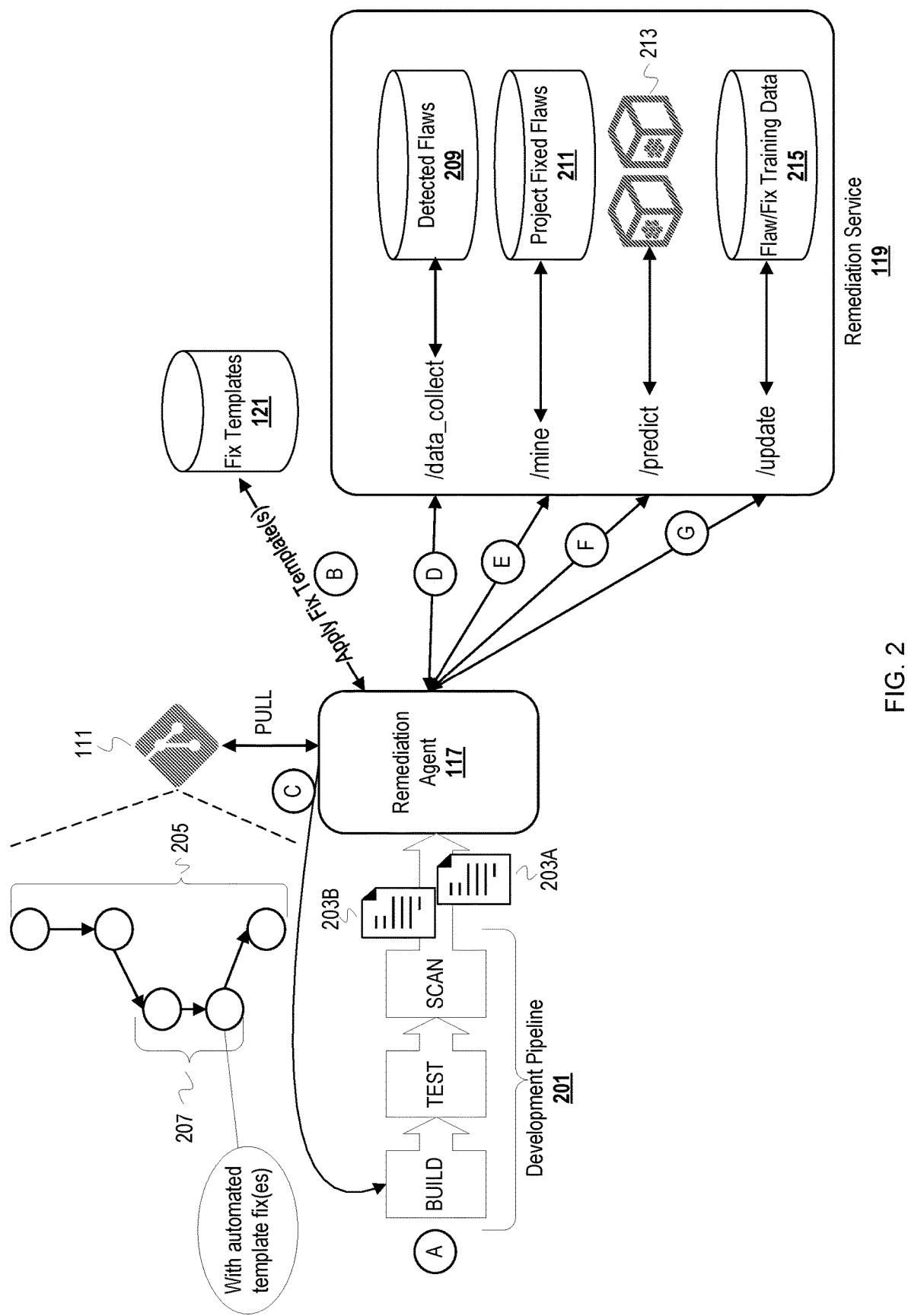
FIG. 2 is a diagram of the remediation agent with example stages illustrating interaction of the remediation agent with the remediation service.

FIG. 2 is a diagram of the remediation agent with example stages illustrating interaction of the remediation agent with the remediation service. In this illustrated example, the remediation agent 117 interacts with the remediation service 119 with functions exposed for the remediation service 119. Each of the depicted stages is not necessarily a single operation or implemented as a single function.

At stage A, a software development pipeline 201 that includes or invokes the remediation agent 117 is run. The software development pipeline 201 may be run upon detection of submission of a code change to a software project or run manually by a software developer. In this illustration, running the software development pipeline 201 involves building, testing, and scanning the software project with the submitted code change. The scan stage of the pipeline 201 generates scan results 203A (e.g., static scan results) that indicate flaws detected from the scanning.

At stage B, the remediation agent 117 determines whether any of the detected flaws can be remediated with a fix template. The remediation agent 117 evaluates the detected flaws against automatic remediation rules. The automatic remediation rules can be defined to search for patterns (e.g., string patterns) of a flaw. A matching pattern is associated with a fix template in the fix templates repository 121. For example, the remediation agent 117 can search the fix template repository 121 for code flaw patterns that match one or more of the detected flaws, which may be a complete or partial match of code corresponding to the flaw. If a match is found, then the template repository 121 returns a template that specifies how to remediate the code (e.g., code string(s) to replace, code to remove, and/or code to insert). The patterns can be based on source code or an intermediate representation of the source code corresponding to the flaw, and the patterns can include wildcards. The remediation agent may parameterize the target program code using wildcards or generic placeholders and/or interpolation applied before or as part of the matching rules.

At stage C, the remediation agent 117 runs the pipeline 201 based on applying a fix template for the updated code change. After applying an applicable fix template(s), the remediation agent submits the updated code. For instance, the remediation agent 117 submits a pull request via a software development tool to the code repository 111 to merge the updated code into a branch or local version of the software project or software project component. A tree 207 represents the branching of the software project with a node indicated as representing the local instance with the automated template fix. The remediation agent 117 runs the pipeline 201 on this local version with the template fix(es) and the scan stage produces new scan results 203B. With these scan results 203B, the remediation agent 117 interacts with the remediation service 119 to update a flaw database, obtain fix suggestions, and update training data. The remediation agent 117 may pass the scan results 203B as an argument or pass the remaining flaw identifiers and descriptors extracted from the scan results 203B.

At stage D, the remediation agent 117 invokes a/data_collect function or command that updates the flaw database having a scope based on the project. As mentioned earlier, this scope may include flaws/fixes of the software project, across projects of a same organization, for a same team, etc. Instead of a flaw database, FIG. 2 illustrates different logical repositories since implementations may store flaws and fixes separately or together, in different database slices, etc. For this illustration, the remediation agent 117 accesses a detected flaws repository 209 to update the flaw repository 209 based on the flaws indicated in the scan results 203B. Updating the flaw repository 209 can be adding a new entry or editing an existing entry. The information added or updated can include a flaw identifier (e.g., a common weakness enumeration (CWE) identifier) in association with indication of the corresponding program code. Indication of the corresponding program code can be the program code, location of the program code within a source code file, and/or a code unit identifier (e.g., function name). Updating the database also includes indicating a fix for a previously detected flaw. The/data_collect function causes the remediation service 119 to evaluate the scan results 203B against preceding scan results to determine whether a flaw was eliminated between scans. Determination of the fix can be based on explicit information (e.g., developer notes associated with a code change) or implicit information (e.g., a change in code corresponding to the eliminated flaw). The/data_collect function can cause an update to an entry in the detected flaws repository 209 for an eliminated flaw to indicate the likely fix. If likely fixes and confirmed fixes are maintained separately, then the data_collect function can update the separate repositories to indicate eliminated flaws and likely fixes.

At stage E, the remediation agent 117 invokes a/mine function or command that searches for potential fixes for the detected flaws in the scan results 203B. In this illustration, the remediation agent 117 accesses a project fixed flaws repository 211 that hosts entries of confirmed fixes and likely fixes for eliminated flaws of the software project. The remediation service 119 searches this repository 211 based on the flaw identifiers and/or descriptors in the scan results 203B. The remediation service 119 can return up to a defined threshold of mining results to the remediation agent 117 or return all mining results to the remediation agent 117, which the remediation agent 117 can select from.

At stage F, the remediation agent 117 invokes a/predict function or command to obtain potential fixes or fix suggestions from a machine learning model pipeline 213. The remediation service 119 provides inputs, based on program code of the flaw, to the machine learning model pipeline 213 and returns output of the model pipeline 213 to the remediation agent 117. As with the mine results, the remediation service 119 may return all of the output of the model pipeline 213 (prediction results) to the remediation agent 117 or selected ones.

At stage G, the remediation agent 117 invokes the/update function or command to provide to the remediation service 119 training data based on use of the suggested fixes (mine results and prediction results) obtained from the remediation service 119 at stages E and F. After the suggested fixes are obtained from the remediation service 119, the remediation agent 117 presents the flaws indicated in the scan results 203B in association with the suggested fixes. The remediation agent 117 detects which suggested fixes are selected for use and labels those for supervised training to update the existing model pipeline 213 or train and deploy a new model pipeline. The remediation agent 117 can communicate the labeled training data at a configured cadence (e.g., every n commits, each selection, etc.).

Figure 3:
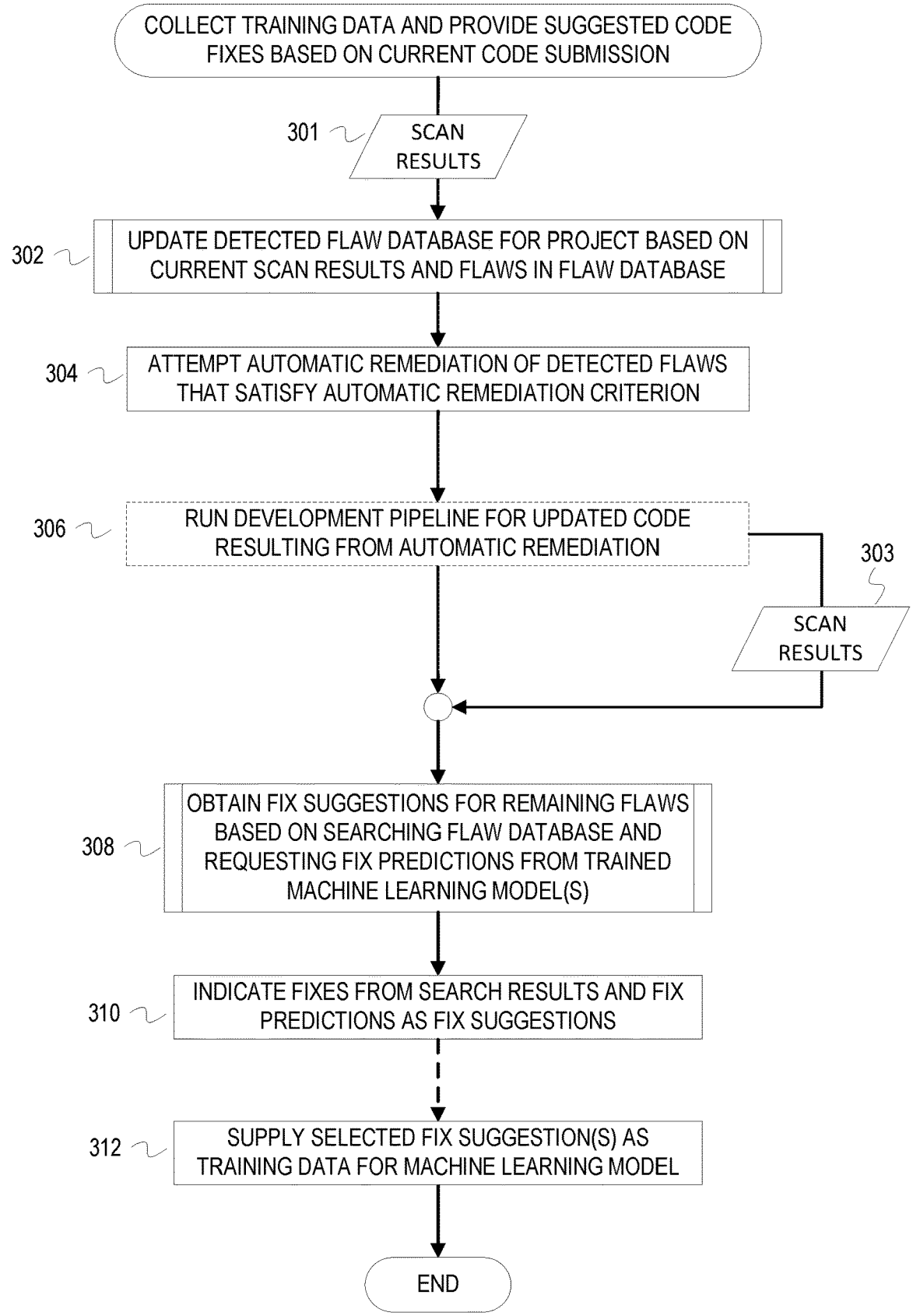
FIG. 3 is a flowchart of example operations for collecting training data and providing suggested code fixes for a current code submission for a software project.
Figure 4:
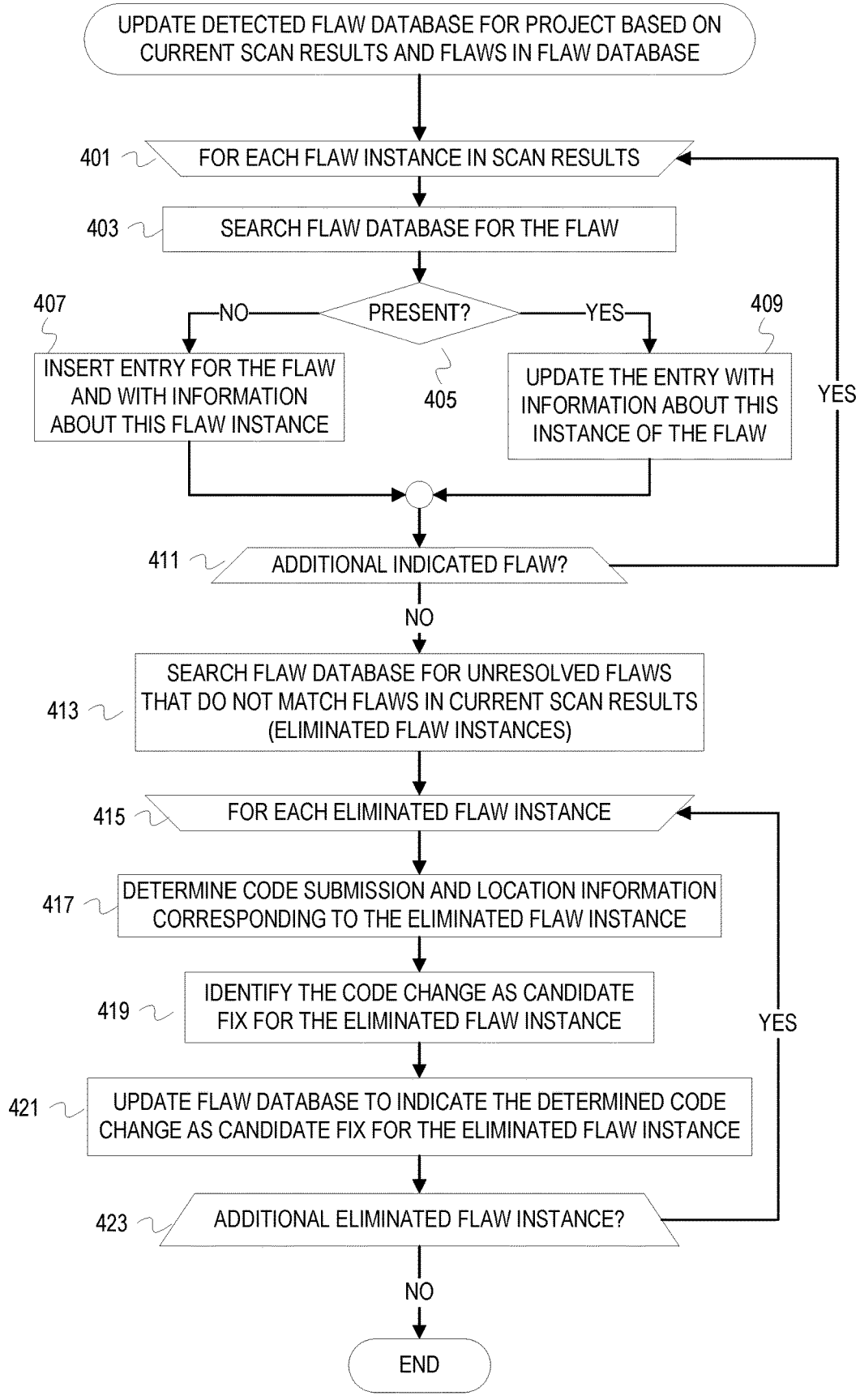
FIG. 4 is a flowchart of example operations for updating a detected flaw database for a software project based on current scan results and flaws already in the flaw database.
Figure 5:
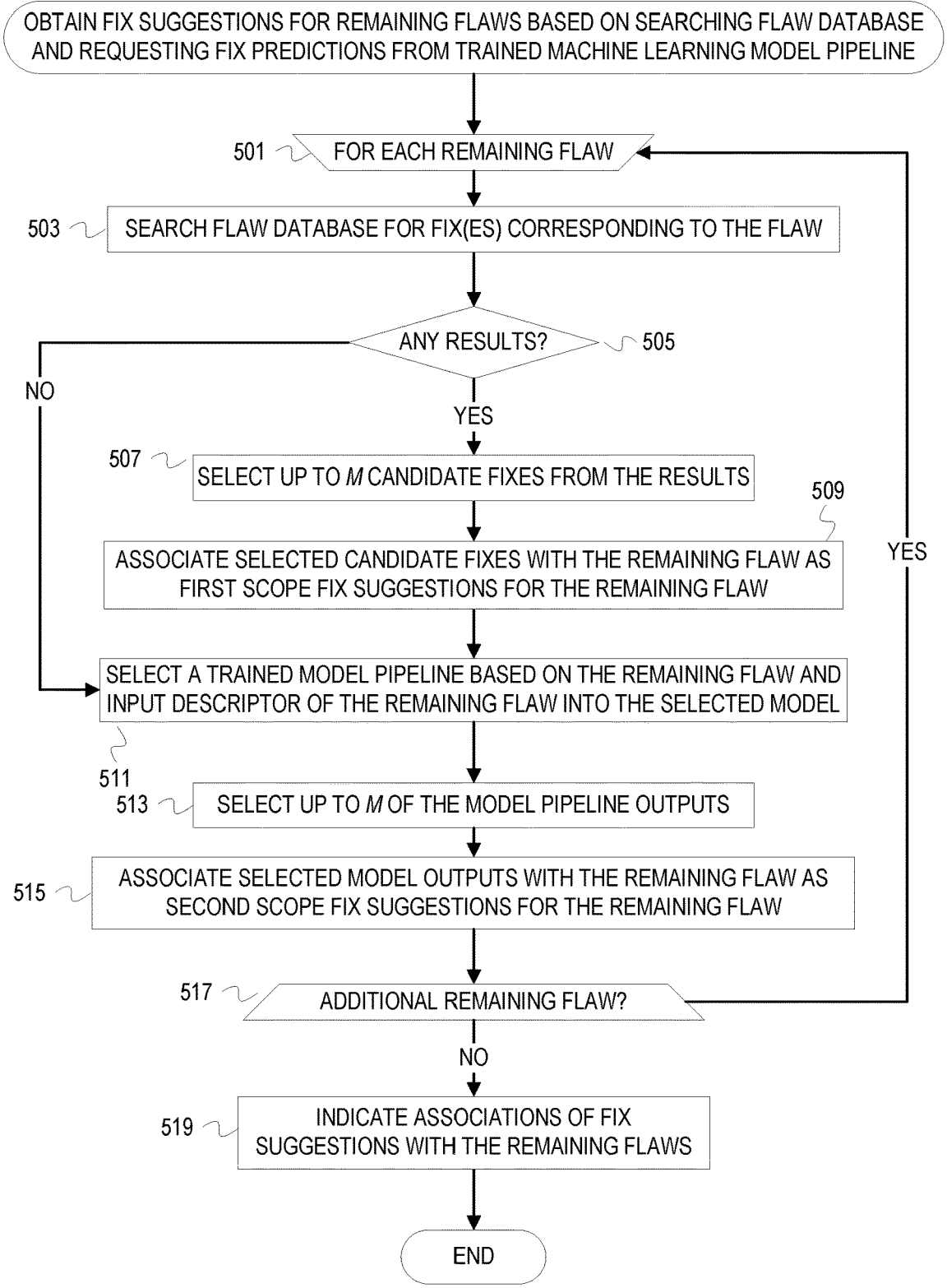
FIG. 5 is a flowchart of example operations for obtaining fix suggestions for remaining flaws based on searching the flaw database and requesting fix predictions from a trained machine learning model(s).

FIGS. 3-5 are flowcharts corresponding to example operations of a remediation agent and a remediation service for assisted code remediation with ongoing learning. Description of these example operations will refer to either a remediation agent or remediation service as performing the example operations, but naming of the actor is for convenience. Naming and organization of program code can be arbitrary and can vary by platform, developer, etc.

FIG. 3 is a flowchart of example operations for collecting training data and providing suggested code fixes for a current code submission for a software project. The example operations are described from the perspective of the remediation agent. The remediation agent begins running based on receipt of scan results 301 from a vulnerability scanner invoked within a software development pipeline of a software project.

At block 302, the remediation agent updates a detected flaw database for the project based on the current scan results (301) and the flaws already indicated in the detected flaw database. The remediation agent can interact with the database through a database API, for example, to add entries or update entries. The flaw database may be maintained by the remediation service with updated performed by the remediation service as a result of the remediation agent passing the scan results to the remediation service. Operations for block 302 are provided in more detail in FIG. 4.

At block 304, the remediation agent attempts automatic remediation of detected flaws that satisfy automatic remediation criterion. A set of rules or conditions are defined for automatic remediation, for example with templates for fixing flaws. A rule may specify a class of flaw that can be remedied with automatic remediation. Depending upon pattern matching as defined for a fix template, the remediation agent would apply the fix template.

At block 306, the remediation agent runs the development pipeline for updated code resulting from the automatic remediation. The remediation agent would merge the updated code into a local instance of the software project or a component of the software project and run the pipeline. Running or executing the pipeline on the updated program code yields scan results 303. If none of the detected flaws in the scan results 301 could be remedied with automatic remediation, then the remediation agent would not perform block 306 and operation would have continued to block 308, as represented by the dashed line for block 306.

At block 308, the remediation agent obtains fix suggestions for the remaining flaws based on searching the flaw database and requesting fix predictions from a trained machine learning model(s). If no automatic remediation was applicable, then the remaining flaws would still be the detected flaws indicated in the scan results 301. If automatic remediation was applicable, then the remaining flaws would be the flaws indicated in the scan results 303. Operations elaborating on block 308 are provided in FIG. 5.

At block 310, the remediation agent indicates fixes from the search results and fix predictions as fix suggestions. For each detected flaw, the remediation agent may have a fix suggestion from the project based mining and the machine learning model pipeline trained to generate code fixes for input flaws. As discussed earlier, the project based mining searches flaw/fix data of a first scope constrained to the software project (e.g., constrained to an organization corresponding to the software project). And the trained machine learning model pipeline has been trained with flaw/fix data of a scope that goes beyond the project (e.g., other organizations possibly including public databases). The remediation agent can present the remaining flaws with the suggested fixes and distinguish between the suggested fixes mined from the constrained scope of flaw/fix data and the suggested fixes corresponding to the larger scope of multi-organization flaw/fix data with explicit labels (e.g., local fix suggestions and global fix suggestions). The remediation agent could be configured to rank the fix suggestions based on the scope or source of the fix suggestions (i.e., mined versus predicted) with priority given to the mined fix suggestions. Regardless of the specific implementation for indicating the fix suggestions, a developer will choose one of the fix suggestions for a remaining flaw or dismiss them all.

Selection and/or dismissal of fix suggestions is used as training data for supervised learning. A dashed line to block 312 represents asynchronous transition between indicating/presenting the fix suggestions and developer decisions. At block 312, the remediation agent supplies selected fix suggestions as training data for models of the remediation service. The remediation agent can provide the raw information (e.g., flaw identifier and selected fix suggestion) or label the fix suggestion as a selected remediation or fix for the corresponding flawed program code.

FIG. 4 is a flowchart of example operations for updating a detected flaw database for a software project based on current scan results and flaws already in the flaw database. The embodiment corresponding to FIG. 4 presumes that the flaw database is maintained separately from the remediation service. Although the operations are described as being performed by the remediation agent, the remediation agent may send requests or invoke API defined functions that cause another entity to perform some of the operations.

At block 401, the remediation agent begins iterating over each flaw instance indicated in the scan results. The description refers to flaw "instance" since a same flaw or type of flaw can occur in multiple locations of program code. The scan results may itemize the flaw instance to allow for easy parsing by the remediation agent, or the remediation agent may pre-process the scan results to identify the individual flaw instances. This first iterating searches the flaw database to insert or update an entry.

At block 403, the remediation agent searches the flaw database for the flaw. To form the search query or search request, the remediation agent includes an identifier of the flaw a descriptor for the flaw instance. A flaw instance descriptor is information that identifies the instance, for example in terms of location. A flaw instance descriptor can be a filename and possible line numbers corresponding to the instance of the flaw. Granularity of the flaw instance can vary across implementations (e.g., module or function name with or without line numbers).

At block 405, the remediation agent determines whether the flaw is present in the flaw database. If present, the flaw database returns contents of the resulting entry or a reference to the entry. Otherwise, a null result is returned. If the flaw is present, then operation continues to block 409. If the flaw is not present in the flaw database, then operation continues to block 407.

At block 407, the remediation agent inserts an entry for the flaw with information about this flaw instance. The remediation agent constructs a request or invokes a function to insert an entry into the flaw database for the flaw and information about the instance. The request or invocation includes as arguments or parameters a flaw identifier and possibly a descriptor corresponding to the flaw. In addition, the remediation agent includes information about this instance of the flaw. This additional information can include a timestamp for the scan, source file name, location information (e.g., program lines), and/or the program code.

At block 409, if the flaw is present, then the remediation agent updates the corresponding entry indicated in the search result with instance information. The remediation agent constructs the request/invocation with the information about this instance (e.g., a timestamp for the scan, location information (e.g., program lines), and/or the program code). Updating the entry does not overwrite the existing flaw instance information but adds the instance information. This allows for a history of flaw within the project to be developed. Operation flows from both block 407 and 409 to block 411.

At block 411, the remediation agent determines whether there is an additional flaw indicated in the scan results. If there is an additional indicated flaw, then operation returns to block 401. Otherwise, operation proceeds to block 413.

At block 413, the remediation agent searches the flaw database for unresolved flaws that do not match flaws indicated in the current scan results. If a flaw present in the flaw database has an instance marked as unresolved but no longer appears in scan results, then the flaw instance has been fixed. While remediation of a flaw instance likely fixed all other instances of that flaw in the project, the example operations described do not assume that case and allow for the case of two instances of a same flaw (e.g., a flaw at different program code locations) having different states (i.e., remaining and fixed). Assuming 3 flaws each having a different number of instances in the scan results, the remediation agent will search the flaw database for each of the 3 flaws and then examine the instance information returned to determine whether any flaw instances were eliminated. Determination of elimination of a flaw instance can be by inference (e.g., a code change at a same location of an eliminated flaw instance) or by explicit information (e.g., developer notation). If the remediation agent determines that a flaw instance(s) has been eliminated, then the remediation agent iterates over each eliminated flaw instance to determine code changes corresponding to the elimination. This iterating for each eliminated flaw instance begins at block 415 and ends at block 432.

At block 417, the remediation agent determines a code submission and location information corresponding to the eliminated flaw instance. The remediation agent can access historical information (e.g., commit log) maintained by the software development tool to determine information for a previous code submission that yielded the scan results that detected the eliminated flaw instance. The remediation agent determines instance information from the entry contents returned from searching the flaw database (block 413). The instance information identifies location of the flaw instance in the program code at that previous code submission.

At block 419, the remediation agent identifies the code change as a candidate fix for the eliminated flaw instance. With the location information of the eliminated flaw instance and previous code submission information, the remediation agent can examine and compare code changes of the current code submission and the previous code submission to determine code change(s) and correlate the code change(s) to elimination of the flaw instance. For example, the remediation agent can examine lines 10-20 of file componentb.file based on location information indicating the eliminated flaw instance as previously occurring in the file componentb.file at lines 13-17. Location information is not necessarily line number and may be method or function names, or entire library file. Alternatively or in addition, the remediation agent can evaluate developer annotations from code submissions to find explicit indications of fixes. The remediation agent can parse developer annotations from the current code submission to determine code fixes.

At block 421, the remediation agent updates the flaw database to indicate the determined code change as a candidate fix for the eliminated flaw instance. The remediation agent can construct a request or invocation with the modified code or reference to the modified code in addition to a flag or value to mark that flaw instance as resolved or fixed.

At block 423, the remediation agent proceeds to the next eliminated flaw instance for processing. If there is an additional eliminated flaw instance, then operation returns to block 415. Otherwise, the process ends.

FIG. 5 is a flowchart of example operations for obtaining fix suggestions for remaining flaws based on searching the flaw database and requesting fix predictions from a trained machine learning model(s). The operations described for FIG. 5 refer to the remediation service. Embodiments can program the agent and service with different degrees of responsibility, such as control of model visibility. These example operations for FIG. 5 presume the remediation service obtains scan results or remaining flaws extracted from the scan results by the remediation agent. These example operations for FIG. 5 also presume that the remediation service maintains the flaw database without compromising any confidential or proprietary information of the entity that controls or owns the software project.

At block 501, the remediation service begins iterating over each remaining flaw. This description refers to a "remaining" flaw to account for the possibility that the remediation agent has already applied at least one fix template to resolve a flaw instance indicated in a preceding scan result. The remaining flaws are those detected from a scan performed after application of the fix template.

At block 503, the remediation service searches the flaw database for a fix(es) corresponding to the remaining flaw. The remediation service can construct a request/invocation that indicates a flaw identifier and a flag or option value filtering results to those with an instance marked as resolved.

At block 505, the remediation service determines whether any results are returned responsive to the search. The flaw database can return a result that includes the program code or program code reference that resolved the flaw. If there are any results, then operation continues to block 507. If no results are returned, operation continues to block 511.

At block 507, the remediation service selects up to M candidate fixes from the returned results. The value for M is a configurable value. For instance, the value can be selected based on user interface preferences.

At block 509, the remediation service associates the selected candidate fixes with the remaining flaw as first scope fix suggestions for the remaining flaw. As the selected candidate fixes are from the flaw database that is populated with flaw/fix data from the project or other projects of a same owning/controlling organization, the candidate fixes are within the constrained or first scope of suggested fixes. The remediation service can label these or weigh these to have priority over suggested fixes of a greater scope. The remediation service can create and populate a data structure or file with these first scope candidate fixes and reference the data structure or file from the data structure or file that indicates the remaining flaw.

At block 511, the remediation service selects a trained model pipeline based on the remaining flaw and inputs structural information about the flawed program code corresponding to the remaining flaw into the selected model pipeline. The remediation service can train and maintain different model pipelines for different software projects and/or flaw classes/types. The remaining flaw is identified by a flaw identifier and described by a flaw descriptor. The flaw descriptor can indicate the flaw type or the flaw type can be determined with the flaw identifier. With the flaw type, the remediation service selects a model pipeline that has been trained to generate candidate/predicted fixes for the flaw type. The remediation service generates a data structure that expresses structural context of the flawed program code (e.g., an abstract syntax tree (AST)), preprocesses the data structure to create a representation, and inputs the representation into the selected model pipeline, which outputs candidate/predicted fixes. The remediation service may maintain a single model pipeline trained for a variety of flaw types. The remediation service may also maintain different models to train for different families or classes of flaws and construct different pipelines with the models.

At block 513, the remediation service selects up to M of the model pipeline outputs. Embodiments are not limited to using the same configurable value as for the mined fix suggestions for reducing the suggested fixes that will be presented.

At block 515, the remediation service associates the selected model outputs with the remaining flaw as second scope suggested fixes for the remaining flaw. Similar to the first scope suggested fixes, association of the second scope suggested fixes with the remaining flaw can be by reference or literally with a data structure or file.

At block 517, the remediation service determines whether there is an additional remaining flaw. If there is an additional flaw to process, then operation returns to block 501. Otherwise, operation continues to block 519.

At block 519, the remediation service indicates the associations of fix suggestions with the remaining flaws to the remediation agent for presentation. The files and/or structures that associate the remaining flaws with the corresponding suggested fixes can be embedded in a message or written to a location accessible by the remediation agent.

Figure 6:
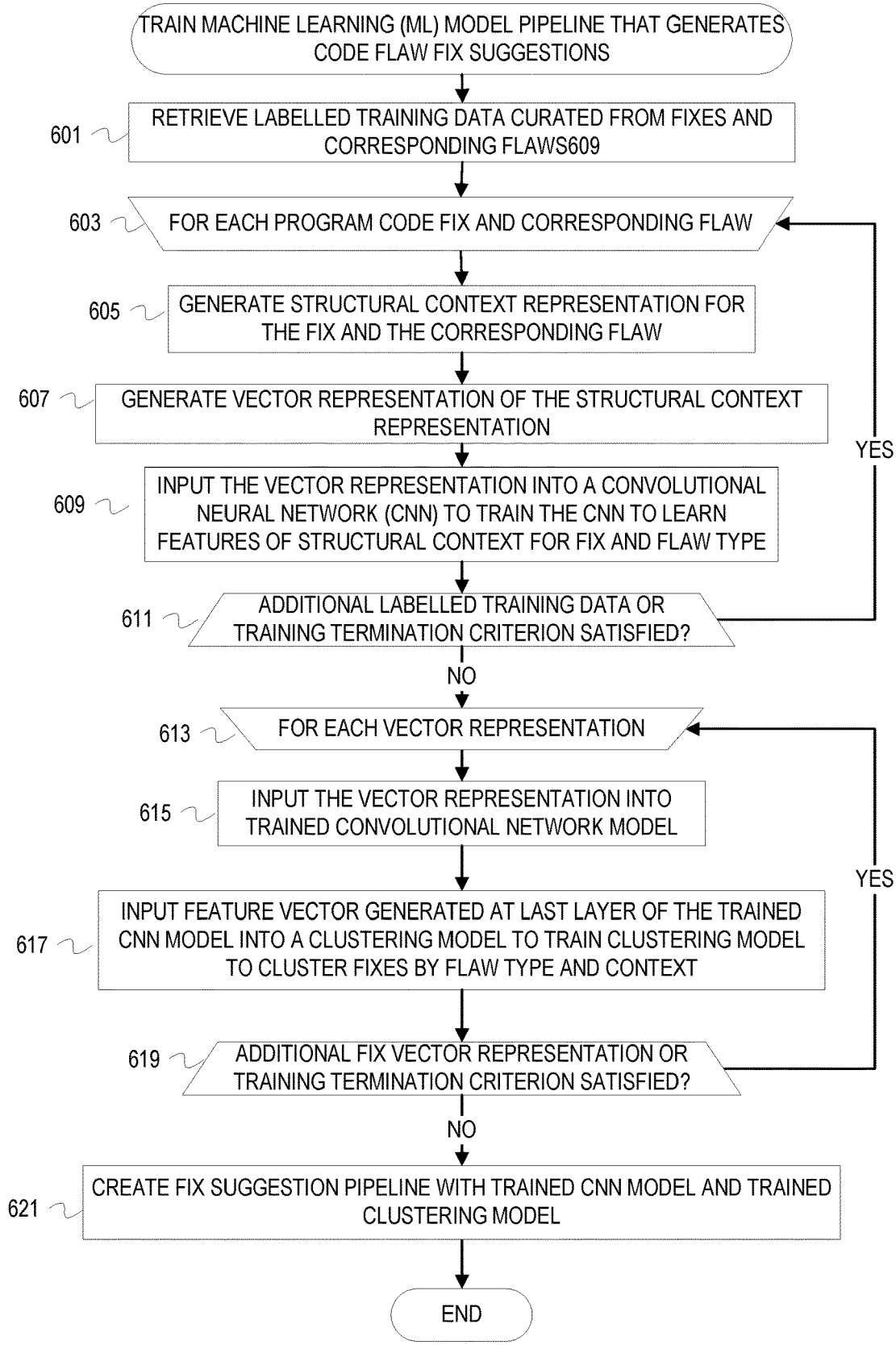
FIG. 6 is a flowchart of example operations for training a fix suggestion pipeline.
Figure 7:
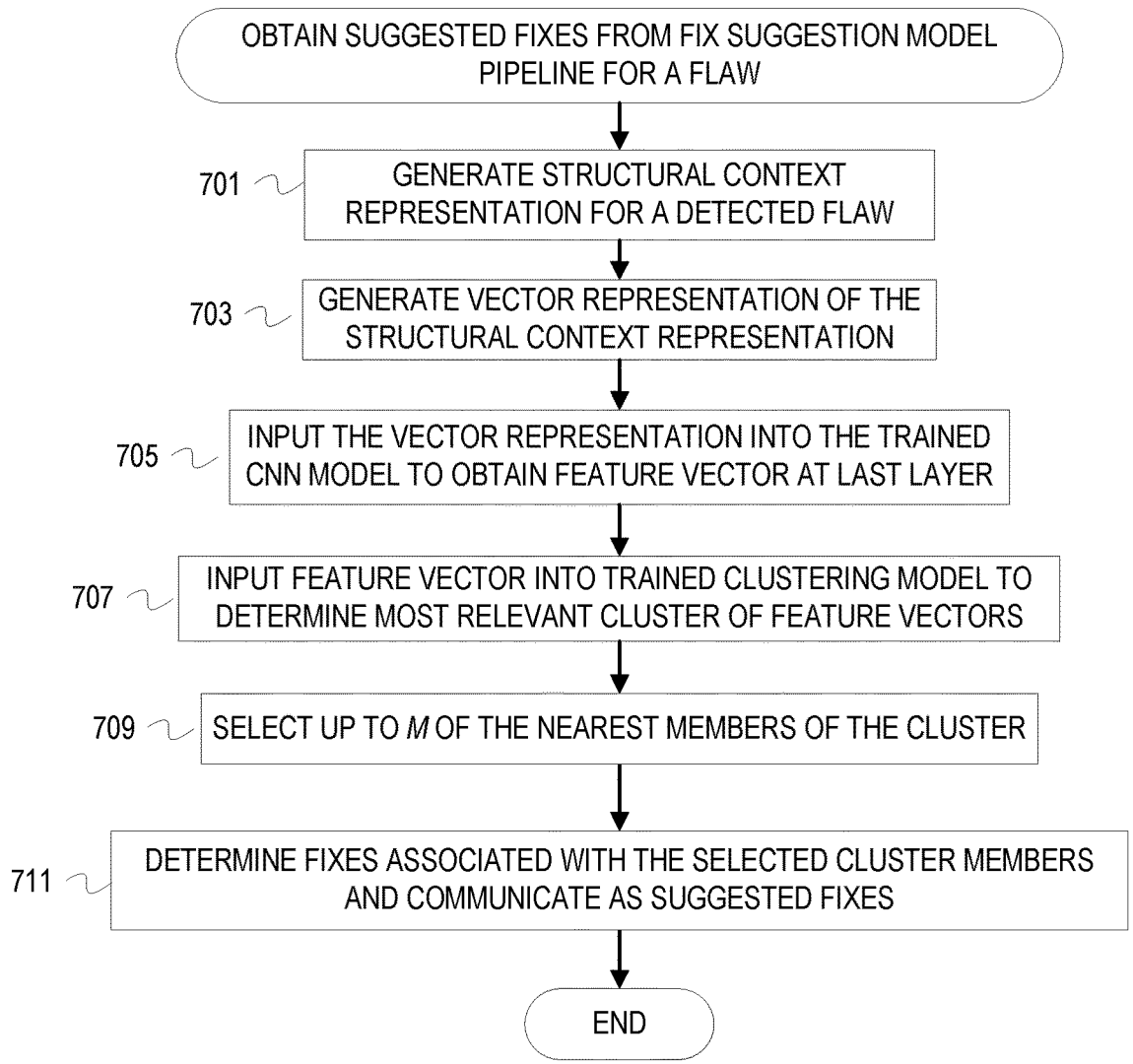
FIG. 7 is a flowchart of example operations for obtaining fix suggestions from a trained fix suggestion pipeline.

As mentioned above, the remediation service employs the machine learning model pipeline to provide predicted fix suggestions. The machine learning model pipeline is trained to learn structural context of different fixes across different types of flaws. The structural context can be described in terms of inheritance, variable declarations, calls, inheritance, etc. Structural context for program code can be expressed with an abstract syntax tree (AST). After learning features for different structural contexts, the model pipeline is trained to cluster fixes by flaw type and structural context. FIGS. 6-7 are flowcharts of example operations for training the ML model pipeline to generate fix suggestions ("fix suggestion pipeline") and use the trained fix suggestion pipeline.

FIG. 6 is a flowchart of example operations for training a fix suggestion pipeline. The fix suggestion pipeline is formed with two ML models in this illustration, which include a convolutional neural network (CNN) model and a clustering model. Embodiments are not limited to a CNN and a clustering model. For instance, a recurrent neural network and traditional feature learning algorithm can be trained. The resulting trained fix suggestion pipeline includes the program code for the individual models and program code that couples the models. The FIG. 6 description refers to the remediation service as performing the example operations.

At block 601, the remediation service retrieves labelled training data curated from fixes and corresponding flaws. In the preceding illustrations, program code fixes and corresponding flaws are determined from commits of a software project. The preceding illustrations also referred to a larger scope of training data curated from public repositories, such as open source projects. The fixes and flaws are identified by one or more source file names and timestamps and/or commit identifiers.

At block 603, the remediation service begins iterating over each of the flaw/fix pairs. As an example, a repository can index entries by flaw type with references to corresponding instances of the flaw type and corresponding fixes.

At block 605, the remediation service generates a representation of structure context for the fix and the corresponding flaw. For instance, the remediate service can genera an abstract syntax tree (AST) that indicates structural context for the fix and the corresponding flaw. The remediation service determines a difference between the source code file(s) containing the flaw and the source code file(s) containing the fix. The remediation service then generates an AST from the difference between the flaw source code file(s) and the fix source code file(s). The remediation service can use a tool that parses source code files, determines a difference between the parsed files, and creates an AST therefrom.

At block 607, the remediation service generates a vector representation of the structural context representation. Generating the vector representation allows the structural context to be fed or input into a machine learning model, in this case a CNN. The vector representation also decomposes the structural context information expressed in an AST into features of structural context.

At block 609, the remediation service inputs the vector representation into the CNN to train the CNN to learn features of structural context for the fix and flaw type. The last fully connected layer is a feature vector that is classified by the classification algorithm of the CNN, for example classifications of the feature with a confidence or prediction value per flaw type.

At block 611, the remediation service determines whether there is additional labelled training data to feed into the CNN. If there is additional training data, then operation returns to block 603 to begin preprocessing the next set of training data. If not, then operation flows to block 613. Training of the CNN model can end with iterating over all training data or satisfying the training termination criterion. After training, the trained CNN is saved as the front stage part of the fix suggestion pipeline.

At block 613, the remediation service begins iterating over each of the vector representations generated from the CNN training. These can be generated before training of the models begins. Each of the vector representation is labelled with the flaw type being fixed by the program code represented by the vector representation.

At block 615, the remediation service inputs the vector representation into the trained CNN. The last layer feature vector generated from the trained CNN model is retrieved while the classification can be discarded.

At block 617, the remediation service inputs the feature vector from the trained CNN model into a clustering model. This trains the clustering model to cluster fixes with similar structural context by flaw type.

At bock 619, the remediation service determines whether there is an additional vector representation for training the clustering model. If so, operation returns to block 613 to process the next vector representation. Otherwise, operation continues to block 621 because training of the clustering model is terminated. As with the CNN training, clustering model training terminates when a training termination criterion is satisfied. In some cases, iterating over all of the training data may be the training termination criterion.

At block 621, the remediation service creates a fix suggestion pipeline with the trained CNN model and the trained clustering model. An input vector to the pipeline would be first input into the trained CNN model. A final layer feature vector generated by the trained CNN model is then passed as input into the trained clustering model.

FIG. 7 is a flowchart of example operations for obtaining fix suggestions from a trained fix suggestion pipeline. For consistency, FIG. 7 is described with reference to the remediation service.

At block 701, the remediation service generates a structural context representation (e.g., an AST) for a detected flaw. The remediation service may receive the source file(s) for the detected flaw from the remediation agent. The remediation service may retrieve the source file(s) based on a description of the detected flaw communicated from the remediation agent. Embodiments can program the remediation agent to use a tool to generate the AST or obtain an intermediate representation from a compiler front end.

At block 703, the remediation agent generates a vector representation of the structural context representation. The remediation agent can use the same word embedding model employed for the pipeline training.

At block 705, the remediation service inputs the vector representation into the trained CNN model. From the trained CNN model, the remediation service obtains a feature vector corresponding to a last layer of the trained CNN model.

At block 707, the remediation service inputs the obtained feature vector into the trained clustering model. The clustering model determines a cluster for the feature vector. Membership of the feature vector in one of the fix structural context clusters indicates similarity of structural context. Although the clustering model was trained with feature vectors of fixes, the feature vectors encoded structural context information of a fix for a flaw type. The feature vector of the flaw will most likely encode a structural context similar to that of one or more fixes for flaws of the same type. This clustering also allows discrimination between fixes of a same flaw type in different structural contexts.

At block 709, the remediation service selects up to M of the nearest neighbors in the determined cluster. The selection limit can be a configuration value communicated from the remediation agent or a parameter of the pipeline.

At block 711, the remediation service determines the fixes associated with the selected cluster members and communicates the determined fixes as suggested fixes. The remediation service maintains references or associations between the feature vectors that form the clusters of the trained clustering model and the corresponding program code fixes. The program code fixes can be identified at different granularities. For instance, a program code fix can be identified by source file name, line numbers, and commit identifier (e.g., branch and timestamp).

Figure 8:
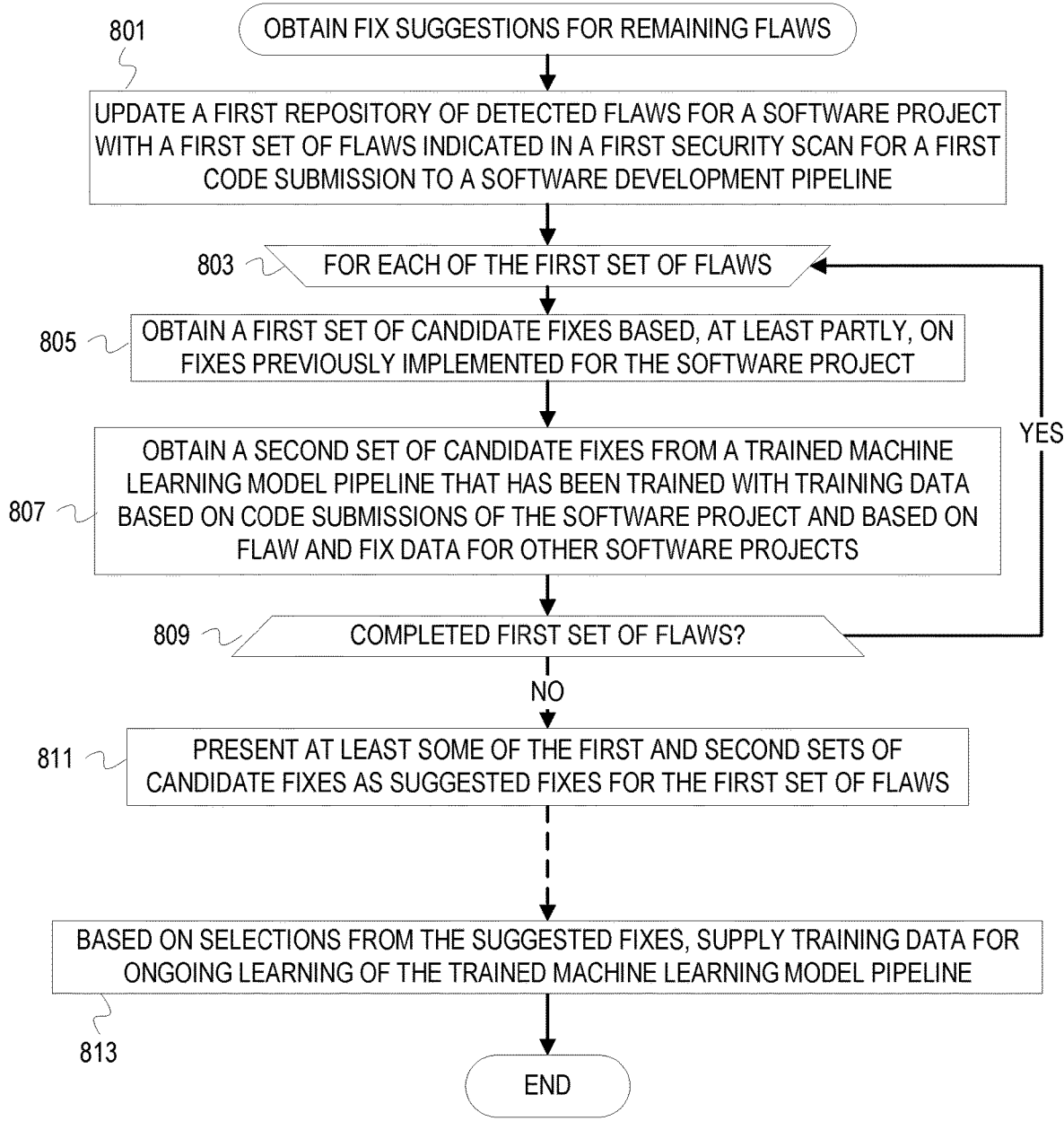
FIG. 8 is a flowchart of operations to obtain suggested program code fixes for detected flaws.
Figure 9:
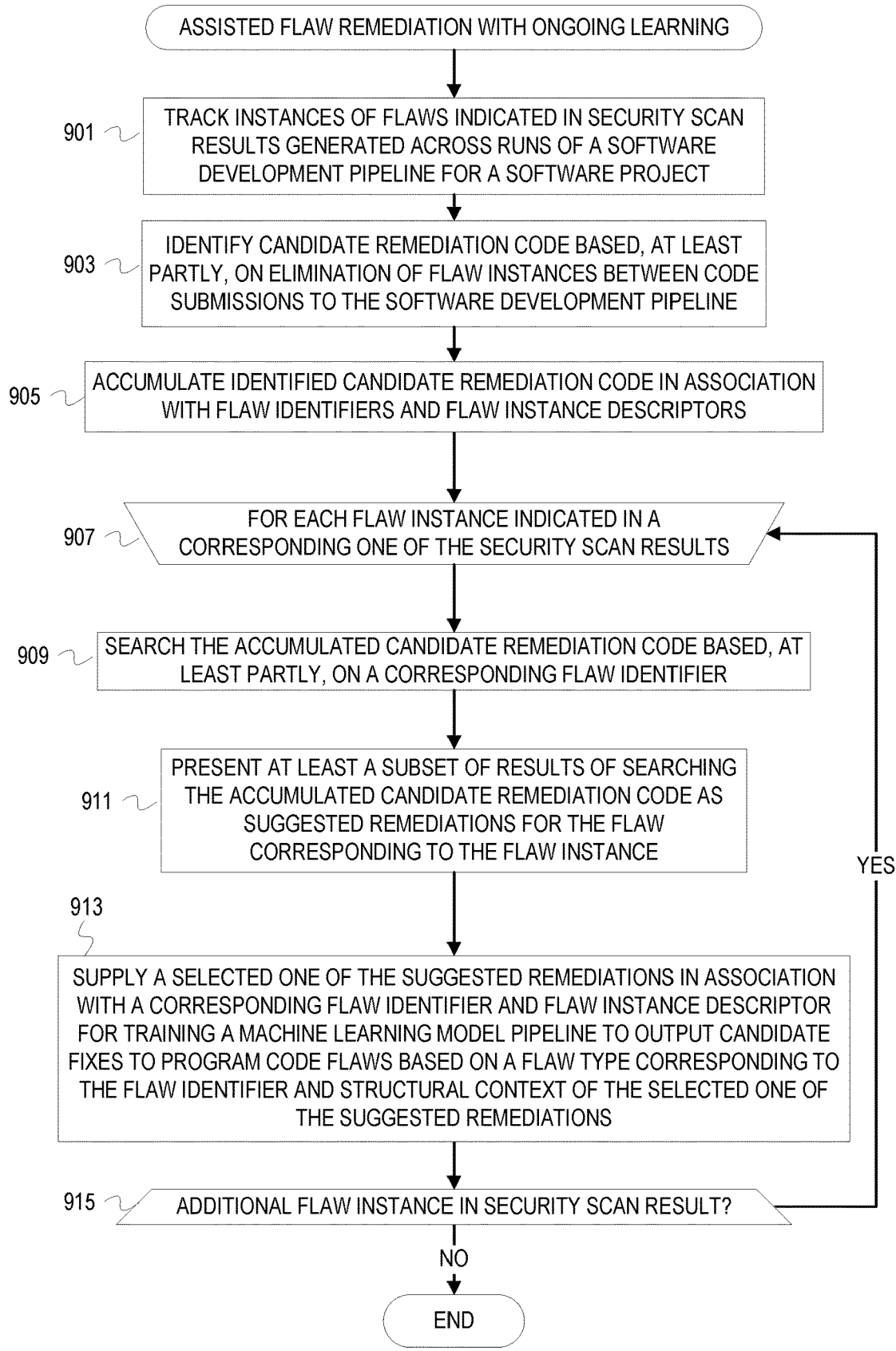
FIG. 9 is a flowchart of example operations for assisted flaw remediation with ongoing learning.
Figure 10:
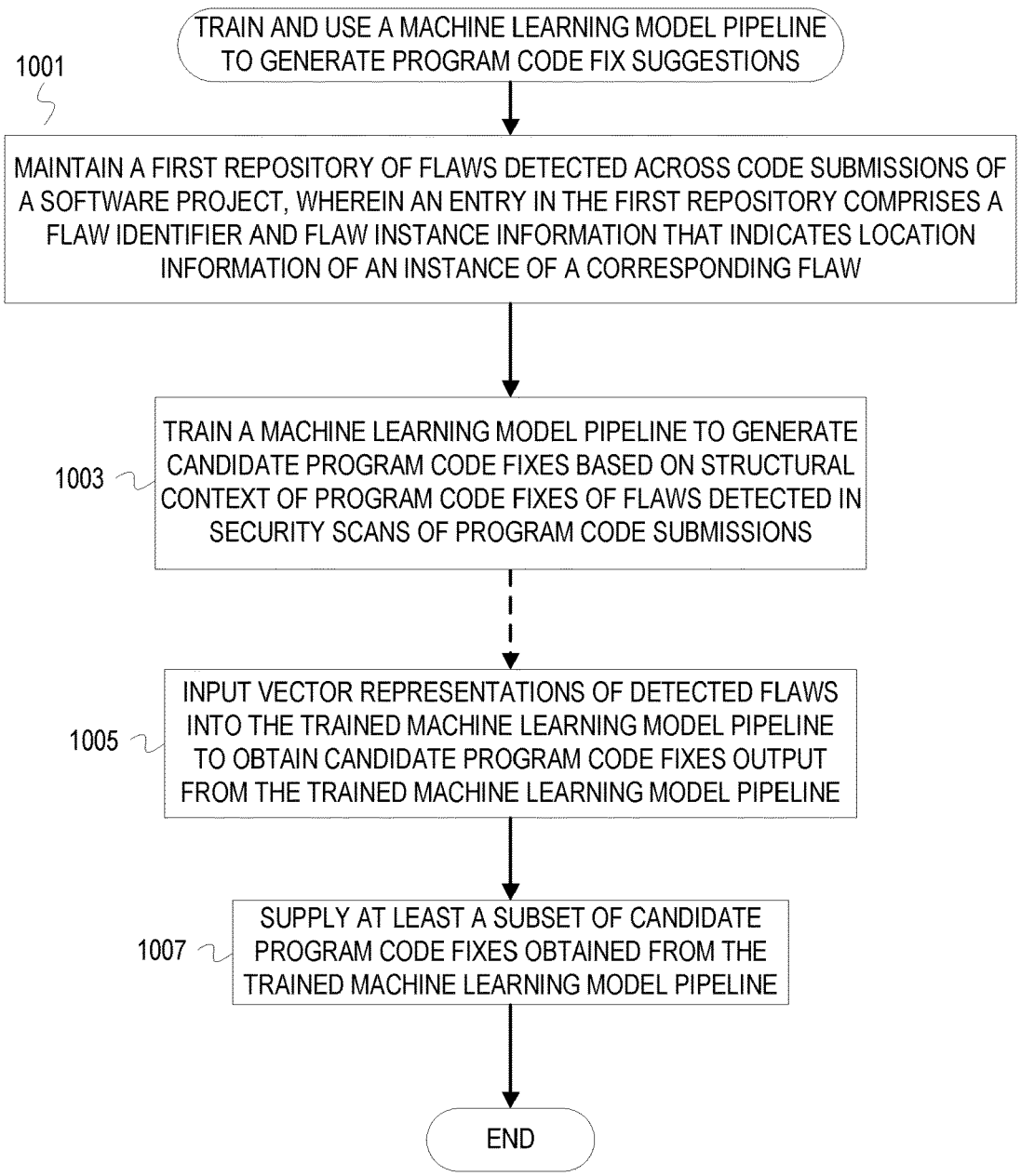
FIG. 10 is a flowchart of example operations to train and use a machine learning model pipeline to generate program code fix suggestions.

FIGS. 8-10 are flowcharts that disclose the innovative technology in broader/different terminology as an attempt to account for the shortcomings of language to describe novel technology. For instance, the term "repository" is used to generically refer to a destination for data storage and maintenance regardless of organization or access implementation. These flowcharts do not refer to a specific actor since there are numerous implementations for organizing and developing program code, as well as various choices for deployment on different hardware and/or virtualization.

FIG. 8 is a flowchart of operations to obtain suggested program code fixes for detected flaws. At block 801, a first repository is updated with a first set of flaws. The first repository is a repository of flaws that have been detected for a software project. The first set of flaws are flaws indicated in a first security scan for a first code submission corresponding to the software project. The code submission is submitted to a software development pipeline defined for the software project.

At block 803, iterative operations begin for each of the first set of flaws. Each iteration includes operations corresponding to blocks 805 and 807. At block 805, a first set of candidate fixes is obtained for current iteration flaw of the first set of flaws. The first set of candidate fixes are based, at least partly, on fixes previously implemented for the software project. At block 807, a second set of candidate fixes is obtained from a trained machine learning model pipeline. The trained machine learning model pipeline has been trained with training data based on code submissions of the software project and training data based on flaw and fix data for other software projects. The software project and other software projects may or may not be of the same source/owner organization. At block 809, it is determined whether iteration over the first set of flaws has completed. If it has not, then flow returns to block 803. Otherwise, flow continues to block 811.

At block 811, at least some of the first and second sets of candidate fixes are presented as suggested fixes for the first set of flaws. Presentation of the candidate fixes as suggested fixes for the first set of flaws can be via messaging, notification, graphical user interface, etc. A user/developer will select which, if any, of the suggested fixes to apply for each of the first set of flaws. Based on the selections from the suggested fixes, training data is supplied for ongoing learning of the trained machine learning model pipeline. The training data that is supplied can include indications of the suggested fixes (e.g., file names and program code lines) and corresponding flaw(s) (e.g., flaw identifier and location of the flaw).

FIG. 9 is a flowchart of example operations for assisted flaw remediation with ongoing learning. While many of the flowcharts approximate program flow, FIG. 9 presents operations that can occur asynchronously across multiple code submissions and scans during a software project. At block 901, instances of flaws indicated in security scan results are tracked. The security scan results are generated across runs of a software development pipeline for a software project.

At block 903, candidate remediation code is identified based, at least partly, on elimination of flaw instances between code submissions to the software development pipeline. Some candidate remediation code may be identified based on code annotations and/or explicit indication of program code as a remediation by a developer. But candidate remediation code can also be implicitly identified by determining elimination of flaws between scan results of different code submissions.

At block 905, identified candidate remediation code is accumulated in association with flaw identifiers and flaw instance descriptors. The identified candidate remediation code or indications of the candidate remediation code (e.g., file names) are accumulated in a repository in association with the flaw identifiers and flaw instance descriptors to facilitate searching.

At block 907, iterative operations begin for each flaw instance indicated in a corresponding one of the security scan results. The iterative operations include those corresponding to blocks 909, 911, 913. At block 909, the accumulated candidate remediation code is searched based, at least partly, on a corresponding flaw identifier. At block 911, at least a subset of results of searching the accumulated remediation code is presented as suggested remediations for the flaw corresponding to the flaw instance. The results are presented for selection and applying for code remediation. At block 913, a selected one of the suggested remediations is supplied in association with a corresponding flaw identifier and flaw instance descriptor. This data is supplied for training a machine learning model pipeline to output candidate fixes to program code flaws based on a flaw type corresponding to the flaw identifier and structural context of the selected one of the suggested remediations. At block 915, it is determined whether an additional flaw instance is to be processed in the security scan result. If so, program flow returns to block 907.

FIG. 10 is a flowchart of example operations to train and use a machine learning model pipeline to generate program code fix suggestions. At block 1001, a first repository of flaws detected across code submissions of a software project is maintained. Maintenance can include insertions, updates, and deletions. An entry in the first repository comprises a flaw identifier and flaw instance information that indicates location information of an instance of a corresponding flaw. An entry can represent multiple instances of a flaw occurring in program code.

At block 1003, the machine learning model pipeline is trained to generate candidate program code fixes based on structural context of program code fixes and flaws detected in security scans of program code submissions. After training, the trained machine learning model pipeline is deployed for use.

After deployment, vector representations of detected flaws are input into the trained machine learning model pipeline at block 1005 to obtain candidate program code fixes. The trained machine learning model pipeline outputs indications or identifiers of candidate program code fixes which can be used to obtain the actual program code fixes.

At block 1007, at least a subset of the candidate program code fixes obtained from the trained machine learning model pipeline. All of the candidate program code fixes could be presented as suggested fixes for a flaw instance represented by the input vector representation.

Variations

The above illustrations refer to a CNN model and a clustering model. Embodiments can use deep learning algorithm based models other than a CNN model. For example, embodiments can employ recurrent neural networks, long short-term memory networks, stacked auto-encoders, and a deep Boltzmann machine. In addition, the clustering model can be based on k-means clustering, k-medians clustering, hierarchical clustering, etc.

Although block 507 describes the remediation service as filtering down the mined candidate fixes, embodiments are not so limited. For instance, the remediation service can return to the remediation agent all of the results or more than M results. The remediation agent can then apply the configurable threshold or a prioritization preference for selecting candidate fixes to reduce the suggestions to be presented. With respect to FIG. 7, although the description refers to the remediation service as performing the operations, the model pipeline can include the program code ("model coupling code") that conveys the last layer feature vector of the trained CNN model as input to the trained clustering model. In that case, the remediation service invokes the trained model pipeline with the vector representation of the flaw AST and retrieves the output from the clustering model.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 11:
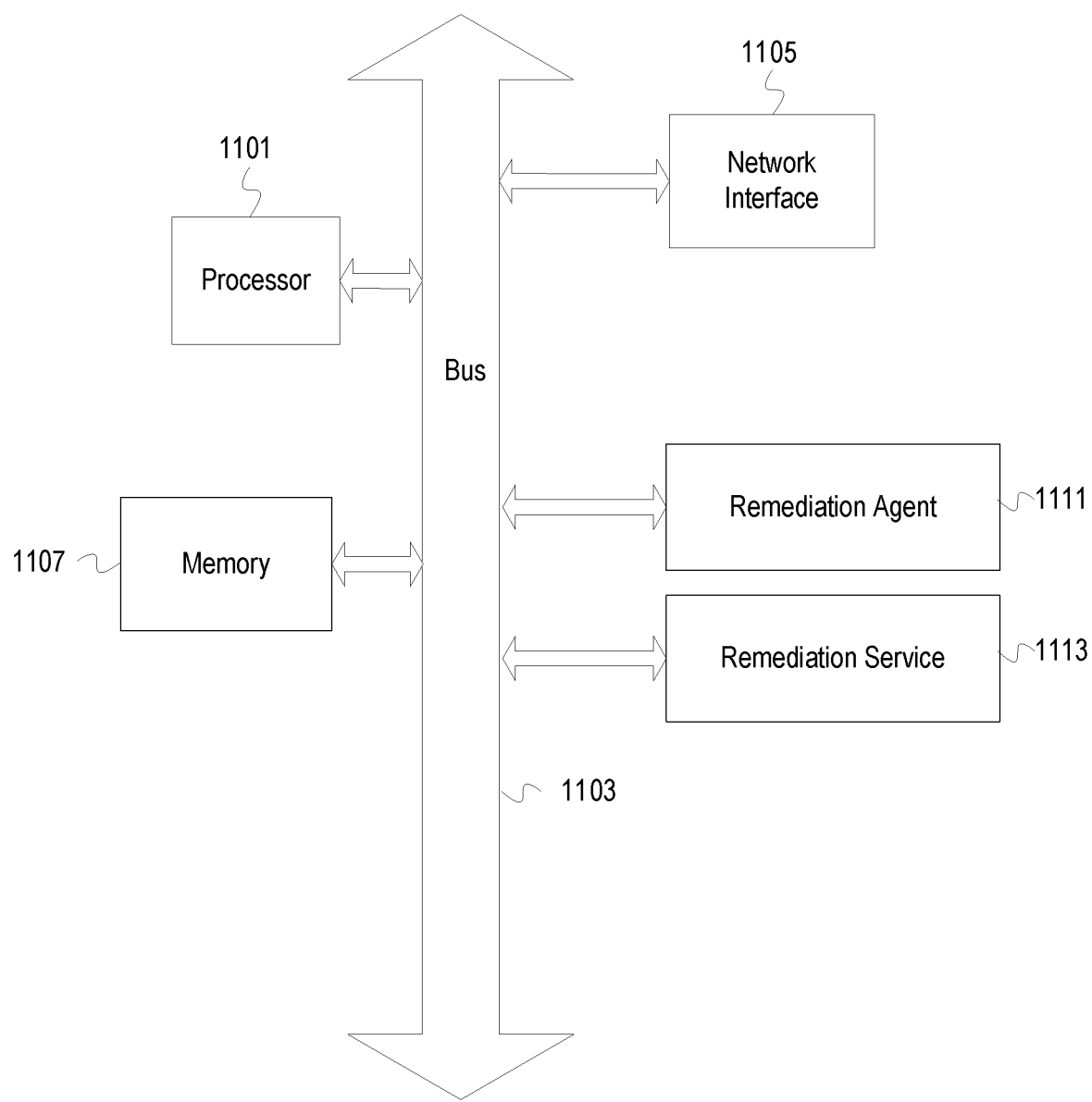
FIG. 11 depicts an example computer system with a remediation agent and a remediation service.

FIG. 11 depicts an example computer system with a remediation agent and a remediation service. Although FIG. 11 illustrates both a remediation agent and a remediation service on a same computer system, in most cases these will be running or hosted on different physical or virtual systems. The computer system includes a processor 1101 (possibly multiple processors, multiple cores, multiple nodes, and/or implementing multi-threading, etc.). The computer system includes memory 1107. The memory 1107 may be system or any one or more of the above already described possible realizations of machine-readable media. The computer system also includes a bus 1103 and a network interface 1105 (e.g., wired or wireless interface). The system also includes a remediation agent 1111 and/or a remediation service 1113. The remediation agent 1111 operates in conjunction or as part of a defined software development pipeline that includes a security scanning stage to detect weaknesses or flaws in program code. As described above, the remediation agent 1111 may apply fix templates to detected flaws and obtains suggested fixes for detected/remaining flaws to present for selection. The remediation service 1113 maintains a database of flaws and fixes for a software project, a fix suggestion machine learning model pipeline, and training data. The remediation service 1113 trains and monitors the trained model pipeline with the training data that is based on different scopes of privacy/relevancy for a software project. The remediation service 1113 provides suggested fixes to the remediation agent 1111 in response to communication of detected flaws from security scan results. Any one of the previously described functionalities may be partially (or entirely) implemented in hardware and/or on the processor 1101. For example, the functionality may be implemented with an application specific integrated circuit, in logic implemented in the processor 1101, in a co-processor on a peripheral device or card, etc. Further, realizations may include fewer or additional components not illustrated in FIG. 11 (e.g., video cards, audio cards, additional network interfaces, peripheral devices, etc.). The processor 1101 and the network interface 1105 are coupled to the bus 1103. Although illustrated as being coupled to the bus 1103, the memory 1107 may be coupled to the processor 1101.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

ILLUSTRATIVE EMBODIMENTS

Embodiment 1: A method comprises updating a first repository of detected flaws for a software project with a first set of flaws indicated in a first security scan for a first code submission to a software development pipeline. For the first set of flaws, first and second sets of candidate fixes are obtained. The first set of candidate fixes is based, at least partly, on fixes previously implemented for the software project. The second set of candidate fixes is obtained from a trained machine learning model pipeline which has been trained with training data. The training data are based on code submissions of the software project and based on flaw and fix data for other software projects. At least some of the first and second sets of candidate fixes are presented as suggested fixes for the first set of flaws. Based on selections from the suggested fixes, training data is supplied for ongoing learning of the trained machine learning model pipeline.

Embodiment 2: The method of Embodiment 1 further comprising determining whether any of a set of fix templates match any of a second set of flaws and applying one or more matching fix templates to the software project, wherein the first set of flaws are those of the second set of flaws not resolved with applying the one or more matching fix templates and the second set of flaws were detected from scanning a second code submission submitted to the software development pipeline prior to the first code submission.

Embodiment 3: The method of Embodiment 2 further comprising merging program code resulting from applying the one or more matching fix templates to a local instance of at least a component of the software project, wherein scanning caused by running the software development pipeline for the first code submission detects the first set of flaws.

Embodiment 4: The method of Embodiment 1 further comprising comparing the first code submission to a previous code submission to determine program code fixes introduced in the first code submission.

Embodiment 5: The method of Embodiment 4 further comprising identifying as a program code fix a program code update in the first code submission that corresponds to a first of the first set of flaws, wherein comparing the first code submission to a previous code submission comprises determining that the first of the first set of flaws was eliminated since the previous code submission.

Embodiment 6: The method of Embodiment 1, wherein supplying training data for ongoing learning of the trained machine learning model pipeline based on selections from the suggested fixes comprises determining which of the suggested fixes were selected for use and labelling the suggested fixes as fixes for corresponding ones of the first set of flaws.

Embodiment 7: The method of Embodiment 6, wherein supplying training data for ongoing learning of the trained machine learning model pipeline comprises supplying, for each suggested fix that was selected for use, a file identifier and a flaw identifier for the corresponding flaw.

Embodiment 8: The method of Embodiment 1, wherein obtaining a first set of candidate fixes based, at least partly, on fixes previously implemented for the software project comprises, for each of the first set of flaws, searching the fixes previously implemented for the software project with a flaw identifier of the flaw.

Embodiment 9: The method of Embodiment 8 further comprising selecting, for each of the first set of flaws, a subset of resulting candidate fixes for presentation as suggested fixes.

Embodiment 10: The method of Embodiment 1, wherein obtaining a second set of candidate fixes from a trained machine learning model pipeline comprises submitting information for each of the first set of flaws for preprocessing to generate input into the trained machine learning model pipeline.

Embodiment 11: One or more non-transitory machine-readable media comprising program code for software flaw remediation, the program code to track flaw instances of flaws indicated in security scan results generated across runs of a software development pipeline for a software project; identify candidate remediation code based, at least partly, on elimination of flaw instances between code submissions to the software development pipeline; accumulate identified candidate remediation code in association with flaw identifiers and flaw instance descriptors.

For each flaw instance indicated in a corresponding one of the security scan results, the program code is executable to search the accumulated candidate remediation code based, at least partly, on a corresponding flaw identifier; present at least a subset of results of searching the accumulated candidate remediation code as suggested remediations for the flaw corresponding to the flaw instance; and supply a selected one of the suggested remediations in association with a corresponding flaw identifier and flaw instance descriptor for training a machine learning model pipeline to output candidate fixes to program code flaws based on a flaw type corresponding to the flaw identifier and structural context of the selected one of the suggested remediations.

Embodiment 12: The non-transitory machine-readable media of Embodiment 11 further comprising program code to, for each flaw instance indicated in a corresponding one of the security scan results, request from the machine learning model pipeline candidate fixes for the flaw instance based, at least in part, on structural context of the flaw instance; and present at least a subset of the output from the trained machine learning model as suggested remediations along with those of the results of searching the accumulated candidate remediation code.

Embodiment 13: The non-transitory machine-readable media of Embodiment 11 further comprising program code to, based on receipt of a security scan result of a user initiated code submission, determine whether a detected flaw indicated in the security scan result of the user initiated code submission can be remediated with a fix template; and based on a determination that a detected flaw indicated in the security scan result of the user initiated code submission can be remediated with a fix template, applying the fix template to generate updated program code and run the software development pipeline on the updated program code.

Embodiment 14: The non-transitory machine-readable media of Embodiment 11, wherein the program code to track flaw instances indicated in security scan results generated across runs of a software development pipeline for a software project comprises program code to determine whether each flaw corresponding to the flaw instances is present in a first repository; for each flaw instance corresponding to a flaw already present in the first repository, update an entry for the flaw to indicate information about the flaw instance; and for each flaw instance corresponding to a flaw not present in the first repository, inserting an entry into the first repository that indicates the flaw and information about the flaw instance.

Embodiment 15: A system comprising a processor, and a machine-readable medium. The machine-readable medium has program code executable by the processor to cause the system to maintain a first repository of flaws detected across code submissions of a software project. An entry in the first repository comprises a flaw identifier and flaw instance information that indicates location information of an instance of a corresponding flaw. The program code is also executable by the processor to cause the system to train a machine learning model pipeline to generate candidate program code fixes based on structural context of program code fixes of flaws detected in security scans of program code submissions; input vector representations of detected flaws into the trained machine learning model pipeline to obtain candidate program code fixes output from the trained machine learning model pipeline; and supply at least a subset of candidate program code fixes obtained from the trained machine learning model pipeline.

Embodiment 16: The system of Embodiment 15, wherein the machine-readable medium further has program code executable by the processor to cause the system to preprocess security code scan results and the program code submissions corresponding to program code fixes to determine the structural context of the program code fixes.

Embodiment 17: The system of Embodiment 16, wherein the program code to cause the system to preprocess security code scan results and the program code submissions corresponding to program code fixes comprises program code executable by the processor to cause the system to, for each of the program code fixes, determine differences between source files of the flaw and the program code fix; generate an abstract syntax tree based on the differences; and generate a vector representation of the abstract syntax tree.

Embodiment 18: The system of Embodiment 15, wherein the program code to train the machine learning model pipeline comprises program code executable by the processor to cause the system to train a deep learning algorithm based model to learn features of different structural contexts of program code fixes across different types of flaws and to train a clustering algorithm based model to cluster program code fixes with similar structural context for each flaw type, wherein the program code to train the clustering algorithm based model uses feature vectors generated from the trained deep learning algorithm based model.

Embodiment 19: The system of Embodiment 18, wherein the machine-readable medium further comprises program code executable by the processor to cause the system to couple the trained clustering algorithm based model to receive as input a last layer feature vector generated from the trained deep learning algorithm based model.

Embodiment 20: The system of Embodiment 18, wherein the deep learning algorithm based model is a convolutional neural network model.

What is claimed is:

1. A method comprising:
    updating a first repository of detected flaws for a software project with a first set of flaws indicated in a first security scan for a first code submission to a software development pipeline;
    for the first set of flaws,
        obtaining a first set of candidate fixes based, at least partly, on fixes previously implemented for the software project; and
        obtaining a second set of candidate fixes from a trained machine learning model pipeline, wherein the trained machine learning model pipeline has been trained with training data based on code submissions of the software project and based on flaw and fix data for other software projects;
    presenting at least some of the first and second sets of candidate fixes as suggested fixes for the first set of flaws; and
    based on selections from the suggested fixes, supplying training data for ongoing learning of the trained machine learning model pipeline.

2. The method of claim 1 further comprising determining whether any of a set of fix templates match any of a second set of flaws and applying one or more matching fix templates to the software project, wherein the first set of flaws are those of the second set of flaws not resolved with applying the one or more matching fix templates and the second set of flaws were detected from scanning a second code submission submitted to the software development pipeline prior to the first code submission.

3. The method of claim 2 further comprising merging program code resulting from applying the one or more matching fix templates to a local instance of at least a component of the software project, wherein scanning caused by running the software development pipeline for the first code submission detects the first set of flaws.

4. The method of claim 1 further comprising comparing the first code submission to a previous code submission to determine program code fixes introduced in the first code submission.

5. The method of claim 4 further comprising identifying as a program code fix a program code update in the first code submission that corresponds to a first of the first set of flaws, wherein comparing the first code submission to a previous code submission comprises determining that the first of the first set of flaws was eliminated since the previous code submission.

6. The method of claim 1, wherein supplying training data for ongoing learning of the trained machine learning model pipeline based on selections from the suggested fixes comprises determining which of the suggested fixes were selected for use and labelling the suggested fixes as fixes for corresponding ones of the first set of flaws.

7. The method of claim 6, wherein supplying training data for ongoing learning of the trained machine learning model pipeline comprises supplying, for each suggested fix that was selected for use, a file identifier and a flaw identifier for the corresponding flaw.

8. The method of claim 1, wherein obtaining a first set of candidate fixes based, at least partly, on fixes previously implemented for the software project comprises:
    for each of the first set of flaws, searching the fixes previously implemented for the software project with a flaw identifier of the flaw.

9. The method of claim 8 further comprising selecting, for each of the first set of flaws, a subset of resulting candidate fixes for presentation as suggested fixes.

10. The method of claim 1, wherein obtaining a second set of candidate fixes from a trained machine learning model pipeline comprises submitting information for each of the first set of flaws for preprocessing to generate input into the trained machine learning model pipeline.

11. One or more non-transitory machine-readable media comprising program code for software flaw remediation, the program code to:
    track instances of flaws indicated in security scan results generated across runs of a software development pipeline for a software project;
    identify candidate remediation code based, at least partly, on elimination of flaw instances between code submissions to the software development pipeline;
    accumulate identified candidate remediation code in association with flaw identifiers and flaw instance descriptors;
    for each flaw instance indicated in a corresponding one of the security scan results,
        search the accumulated candidate remediation code based, at least partly, on a corresponding flaw identifier;
        present at least a subset of results of searching the accumulated candidate remediation code as suggested remediations for the flaw corresponding to the flaw instance; and
        supply a selected one of the suggested remediations in association with a corresponding flaw identifier and flaw instance descriptor for training a machine learning model pipeline to output candidate fixes to program code flaws based on a flaw type corresponding to the flaw identifier and structural context of the selected one of the suggested remediations.

12. The non-transitory machine-readable media of claim 11 further comprising program code to:
    for each flaw instance indicated in a corresponding one of the security scan results, request from the machine learning model pipeline candidate fixes for the flaw instance based, at least in part, on structural context of the flaw instance; and
    present at least a subset of the output from the trained machine learning model pipeline as suggested remediations along with those of the results of searching the accumulated candidate remediation code.

13. The non-transitory machine-readable media of claim 11 further comprising program code to:
    based on receipt of a security scan result of a user initiated code submission, determine whether a detected flaw indicated in the security scan result of the user initiated code submission can be remediated with a fix template; and based on a determination that a detected flaw indicated in the security scan result of the user initiated code submission can be remediated with a fix template, applying the fix template to generate updated program code and run the software development pipeline on the updated program code.

14. The non-transitory machine-readable media of claim 11, wherein the program code to track flaw instances indicated in security scan results generated across runs of a software development pipeline for a software project comprises program code to:

determine whether each flaw corresponding to the flaw instances is present in a first repository;

for each flaw instance corresponding to a flaw already present in the first repository, update an entry for the flaw to indicate information about the flaw instance; and for each flaw instance corresponding to a flaw not present in the first repository, inserting an entry into the first repository that indicates the flaw and information about the flaw instance.

15. A system comprising:

a processor; and a machine-readable medium having program code executable by the processor to cause the system to, maintain a first repository of flaws detected across code submissions of a software project, wherein an entry in the first repository comprises a flaw identifier and flaw instance information that indicates location information of an instance of a corresponding flaw;

train a machine learning model pipeline to generate candidate program code fixes based on structural context of program code fixes of flaws detected in security scans of program code submissions;

input vector representations of detected flaws into the trained machine learning model pipeline to obtain candidate program code fixes output from the trained machine learning model pipeline; and supply at least a subset of candidate program code fixes obtained from the trained machine learning model pipeline.

16. The system of claim 15, wherein the machine-readable medium further has program code executable by the processor to cause the system to preprocess security code scan results and the program code submissions corresponding to program code fixes to determine the structural context of the program code fixes.

17. The system of claim 16, wherein the program code to cause the system to preprocess security code scan results and the program code submissions corresponding to program code fixes comprises program code executable by the processor to cause the system to, for each of the program code fixes:

determine differences between source files of the flaw and the program code fix;

generate an abstract syntax tree based on the differences; and generate a vector representation of the abstract syntax tree.

18. The system of claim 15, wherein the program code to train the machine learning model pipeline comprises program code executable by the processor to cause the system to train a deep learning algorithm based model to learn features of different structural contexts of program code fixes across different types of flaws and to train a clustering algorithm based model to cluster program code fixes with similar structural context for each flaw type, wherein the program code to train the clustering algorithm based model uses feature vectors generated from the trained deep learning algorithm based model.

19. The system of claim 18, wherein the machine-readable medium further comprises program code executable by the processor to cause the system to couple the trained clustering algorithm based model to receive as input a last layer feature vector generated from the trained deep learning algorithm based model.

20. The system of claim 18, wherein the deep learning algorithm based model is a convolutional neural network model.

* * * * *